United States Patent [19]

Poznanski et al.

[11] Patent Number: 5,978,798
[45] Date of Patent: Nov. 2, 1999

[54] APPARATUS FOR AND METHOD OF ACCESSING A DATABASE

[75] Inventors: Victor Poznanski, Oxford; John Beaven, Edinburgh, both of United Kingdom

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/874,896

[22] Filed: Jun. 13, 1997

[30] Foreign Application Priority Data

Jun. 14, 1996 [GB] United Kingdom .................... 9612474

[51] Int. Cl.⁶ .................................................. G06F 17/00
[52] U.S. Cl. .............................. 707/4; 707/101; 707/104; 707/501
[58] Field of Search ........................ 707/1–536; 704/257; 369/32–54

[56] References Cited

U.S. PATENT DOCUMENTS

| 4,775,956 | 10/1988 | Kaji et al. . |
| 5,181,163 | 1/1993 | Nakajima et al. ....................... 364/419 |
| 5,523,946 | 6/1996 | Kaplan et al. . |
| 5,590,107 | 12/1996 | Chatani ..................................... 369/54 |
| 5,600,835 | 2/1997 | Garland et al. .............................. 707/5 |
| 5,606,690 | 2/1997 | Hunter et al. ............................... 707/5 |
| 5,680,511 | 10/1997 | Baker et al. ............................. 704/257 |

FOREIGN PATENT DOCUMENTS

| 0262938 | 4/1988 | European Pat. Off. . |
| 06243162 | 9/1994 | Japan . |
| 06325081 | 11/1994 | Japan . |

OTHER PUBLICATIONS

European Search Report for Application No. 97304196.5 dated Nov. 11, 1998.

IBM Technical Disclosure Bulletin, "Dictionary Access Method with Word Occurrence," vol. 38, No. 08, pp. 365–366, Aug. 1995.

Search Report for Application GB 9612474.8; Dated Jul. 26, 1996.

*Primary Examiner*—Wayne Amsbury
*Assistant Examiner*—David Yiuk Jung

[57] ABSTRACT

A method is provided of accessing a database comprising a plurality of entries, each entry comprising a main entry containing a headword. At least one of the entries comprises a first subsidiary entry (2) containing a plurality of sets of words, each of which is capable of being associated with the headword. The method comprises the steps of: entering a section of text which comprises a plurality of words; locating the entry whose main entry contains the headword corresponding to a selected word of the section of text; and, where the located entry has a first subsidiary entry containing a plurality of sets of words, selecting from the first subsidiary entry a set of words of which at least one word is present in at least part of the section of text.

45 Claims, 6 Drawing Sheets

| John$_1$ | make$_2$ | good$_3$ | use$_4$ | of$_5$ | his$_6$ | knowledge$_7$ |
|---|---|---|---|---|---|---|
|  | make[verb] |  | use$_{2,5}$ use[verb] use[noun] |  |  |  |

FIG. 7

| John$_1$ | make$_2$ | good$_3$ | use$_4$ | of$_5$ | his$_6$ | knowledge$_7$ |
|---|---|---|---|---|---|---|
| John | faire | bien | utiliser$_{2,5}$ | de | son | connaisance |
| Jean | créér | gentil | emploi |  |  | science |
|  | rendre | salutable | usage |  |  |  |
|  | obliger | expert |  |  |  |  |
|  |  | bon |  |  |  |  |

FIG. 8

APPARATUS FOR AND METHOD OF ACCESSING A DATABASE

The present invention relates to an apparatus for a method of accessing a database, for example of the kind used in machine readable dictionaries, such as monolingual dictionaries, thesauri, encyclopedias and bilingual dictionaries.

Such a database is typically indexed using a single word called a headword.

JP-A-6 243 162 relates to a machine translation system comprising an OCR to input a document. The document is divided into morphemes by morphological analysis for processing. A "part of speech" inference method is used based on the preceding two words in the morpheme in order to calculate the probability of the suitability of a translation.

EP 0 262 938 discloses a system for translating phrases from a first language into a second language. The system has a store containing a collection of phrases in the second language and attempts to identify which of these phrases corresponds to each input phrase in the first language. In particular, the system attempts to recognize a relatively small number of keywords for characterising the input phrases so as to identify the corresponding output phrases and provide a relatively quick translation.

U.S. Pat. No. 5,181,163 discloses a technique for generating or updating entries in a cooccurence dictionary. Such a dictionary contains lists of word pairs which occur together in a certain syntactic relationship in a natural language. Such dictionaries are used in some machine translation systems for translating from a first language to a second language and provide information about the first language. Input text is syntactically analysed and the result is analysed for ambiguity of pairs of words having the desired semantic relationship. Pairs of words which are free from ambiguity are then used to generate or update entries.

According to a first aspect of the present invention, there is provided a method of accessing a database comprising a plurality of entries, each entry comprising a main entry containing a headword and at least one of the entries comprising a first subsidiary entry containing a plurality of sets of words, each of which is capable of being associated with the headword, the method comprising the steps of:

(i) entering a section of text comprising a plurality of words;

(ii) locating the entry whose main entry contains the headword corresponding to a selected word of the section of text; and (iii) where the located entry has a first subsidiary entry containing a plurality of sets of words, selecting from the first subsidiary entry a set of words of which at least one word is present in at least part of the section of text.

Preferably, the section of text comprises a grammatically complete section.

Preferably, the at least part of the section comprises N words on each side of the selected word, where N is an integer greater than or equal to one.

Preferably, the steps (ii) and (iii) are repeated for each word of the section of text.

Preferably, the further step of allocating to each selected set a preference value determined as a function of the words in the set, for example, the cardinality of the set, or a property of one or more words in the set, such as the likelihood of their single or joint occurrence.

Alternatively or additionally, the function may correspond to the probability or frequency of use of the set.

In one embodiment, the database is a multilingual dictionary, the main entries and the first subsidiary entries contain source language words, and each entry further comprises a second subsidiary entry containing at least one target language translation of the headword. The multilingual dictionary may be a reversible bilingual dictionary.

Preferably, each target language translation is associated with a respective set of words in the associated first subsidiary entry. More preferably, the method comprises the further steps of selecting one of the target language translations and inhibiting selection of a translation of each word contained in the set of words associated with the selected translation. Most preferably, the method comprises the step of selecting the target language translations for the words of the section of text in descending order of the preference values.

Preferably, the method comprises the further steps of deselecting the selected one of the target language translations, uninhibiting selection of a translation of each word contained in the set of words associated with the selected translation, selecting another of the target language translations, and inhibiting selection of a translation of each word contained in the set of words associated with the selected other translation.

The database may be a machine readable dictionary, thesaurus, or encyclopedia, or a multimedia dictionary. The machine readable thesaurus may be a reversible machine readable thesaurus. The located entry may be given substantially the same linguistic inflection as the at least one word present in at least part of the section of text. The database may be stored in a CD-ROM.

According to a second aspect of the present invention, there is provided an apparatus for accessing a database comprising a plurality of entries, each entry comprising a main entry containing a headword and at least one of the entries comprising a first subsidiary entry containing a plurality of sets of words, each of which is capable of being associated with the headword, the apparatus comprising:

(i) an input means for entering a section of text comprising a plurality of words;

(ii) means for locating the entry whose main entry contains the headword corresponding to a selected word of the section of text, and (iii) means for selecting from the first subsidiary entry a set of words of which at least one word is present in at least part of the section of text where the located entry has a first subsidiary entry containing a plurality of sets of words.

Preferably, the section of text comprises a grammatically complete section.

Preferably, the at least part of the section comprises N words on each side of the selected word, where N is an integer greater than or equal to one.

Preferably, an allocating means is provided for allocating to each selected set a preference value determined as a function of the words in the set, for example, the cardinality of the set, or properties of one or more words in the set, such as the likelihood of their single or joint occurrence.

Alternatively or additionally, the function may correspond to the probability or frequency of use of the set.

In one embodiment, the database is an electronic multilingual dictionary, the main entries and the first subsidiary entries contain source language words, and each entry further comprises a second subsidiary entry containing at least one target language translation of the headword. The multilingual dictionary may be a reversible bilingual dictionary.

Preferably, each target language translation is associated with a respective set of words in the associated first subsidiary entry. More preferably, means are provided for selecting one of the target language translations and inhibiting selection of a translation of each word contained in the set of words associated with the selected translation. Most preferably, means are provided for selecting the target language translations for the words of the section of text in descending order of the preference values.

Preferably, means are provided for deselecting the selected one of the target language translations, uninhibiting selection of a translation of each word contained in the set of words associated with the selected translation, selecting another of the target language translations, and inhibiting selection of a translation of each word contained in the set of words associated with the selected other translation.

The database may be a machine readable dictionary, thesaurus, encyclopedia or multimedia dictionary. The machine readable thesaurus may be a reversible machine readable thesaurus. Generation means may be provided for giving the located entry substantially the same linguistic inflection as the at least one word present in at least part of the section of text. The database may be stored on a CD-ROM.

It is thus possible to provide an apparatus for and method of accessing a database which obtains entries that are pertinent to a particular query and context.

The present invention will now be described, by way of example, with reference to the accompanying drawings, in which:

FIG. 7 illustrates a lookup buffer according to the method of FIG. 3.

FIG. 8 shows an example of the lookup buffer of FIG. 7 in accordance with another embodiment of the present invention relating to bilingual dictionaries.

Figure 1:
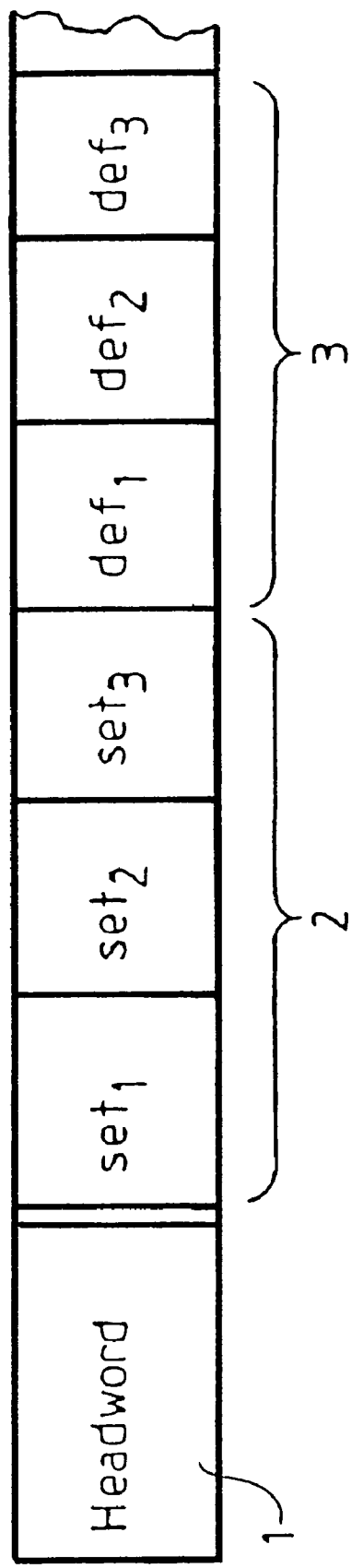
FIG. 1 shows an example of a data structure according to an embodiment of the present invention.
Figure 2:
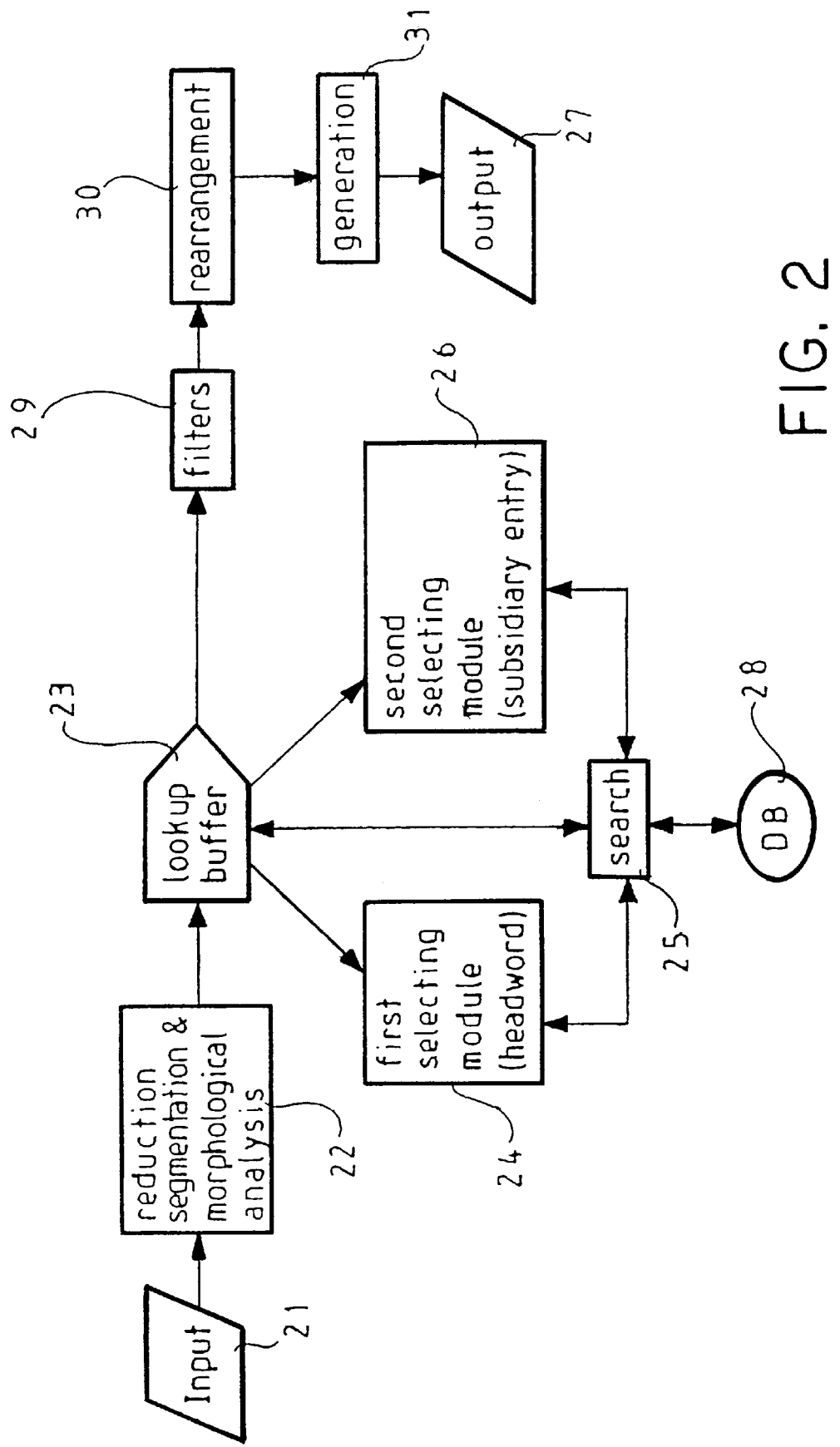
FIG. 2 shows an apparatus according to an embodiment of the present invention.

The data structure of FIG. 1 is used to store the various entries in a database 28 (see FIG. 2). Each entry comprises a main entry containing a headword 1 and a first subsidiary entry 2 comprising sets of words ($Set_1$–$Set_3$) capable of being associated with the headword 1 to form a linguistic construction.

If there are no sets of words which can be combined with the headword 1, nothing is stored in the first subsidiary entry 2. The data structure also has a second subsidiary entry 3 comprising definitions $Def_1$, $Def_2$, $Def_3$ or target language translations corresponding to respective combinations of the headword 1 and the sets of words in the first subsidiary entry 2.

The apparatus of FIG. 2 comprises an input terminal 21 for entering a section of text to be queried or translated into a target language. Alternatively, other means capable of inputting a section of text, for example a voice recognition system or an Optical Character Reader (OCR), can be used. The input terminal 21 is connected to a lookup buffer 23 via a reduction module 22 for segmenting and reducing the section of text. The lookup buffer 23 temporarily stores the section of text segmented and reduced by the reduction module 22 and is connected to a searching module 25 and a first selecting module 24, the searching module 25 also being connected to a database 28. The searching module 25 and the lookup buffer 23 are connected to a second selecting module 26. The look up buffer 23 is also connected to an output device 27, for example a display or a printer, via a filter module 29, a rearrangement module 30 and a generation module 31.

The apparatus described above is capable of being implemented in hardware or software and integrated into an electronic monolingual dictionary, thesaurus, encyclopedia, bilingual dictionary, or any other apparatus which searches the database on the basis of a section of text input, for example, from a CD-ROM system.

Figure 3:
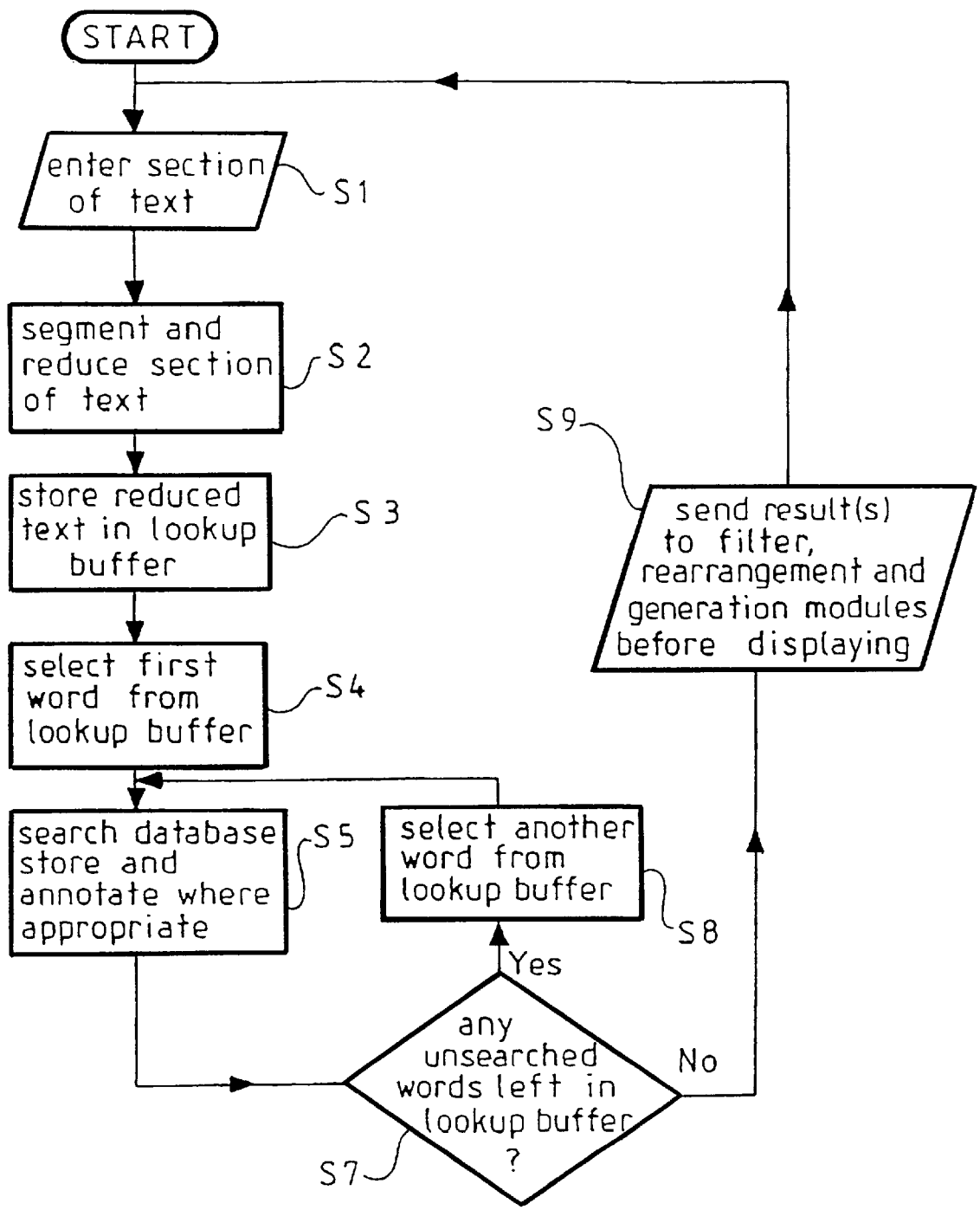
FIG. 3 is a flow diagram of a method according to an embodiment of the present invention for use with the apparatus of FIG. 2.

Referring to FIG. 3, in operation a grammatically complete section of text, for example, a phrase, a clause, or a sentence, such as "John made good use of his knowledge", is entered by a user (not shown) (step S1) using the input terminal 21. The words comprising the section of text are segmented, or broken up into words, and reduced to their associated headwords (or indexed terms), for example by morphological analysis by the reduction module 22 (step S2). In the case of "John made good use of his knowledge", it is only necessary to change the word "made" to "make". The reduced text is then transferred to the lookup buffer 23 (step S3). The first word in the lookup buffer 23 is then selected by the first selecting module 24 (step S4) and searched in the database 28 by the searching module 25 (step S5). If an entry is found, the entry is stored in the lookup buffer and annotated. This step of searching, storing and annotating will be further described hereinbelow.

The lookup buffer 23 is then checked for unsearched words (step S7) and if unsearched words exist, they are each selected in turn (step S8) and searched in the database 28 (step S5). Once all of the words in the lookup buffer 23 have been searched, the results are sent to the filter module 29, the rearrangement module 30 and the generation module 31, before being displayed or sent to a display module for querying by the user (step S9).

The morphological analysis performed by the reduction module 22 (Step S2) does not simply reduce a word to a corresponding infinitive, for example "made" to "make", but associates other linguistic information with the reduced word; for example "made" can be reduced to "make past". the additional linguistic information is retained for where the database is a thesaurus or a bilingual dictionary. In such cases, it may be necessary to reconstruct an inflected word from the linguistic information available, for example, "make use of" can be reduced to "make past use of". If the database is a thesaurus, the entry found for "made use of", the English word "utilise", might be converted to "utilise past"; the generation module 31 performs such conversion by fitting the "past" affix to "utilise" to generate "utilised" (if required by the user). The use of the generation module 31 should not be limited to cases where the database is a thesaurus.

The filer module 29 may comprise more than one filter, for example, an "affix filter" and/or a "context filter". The affix filter can remove affixes such as "past" (described above) from the results(s) to be output. For example, instead of displaying "utilise past", the word "utilise" is simply output. The context filter is used, where required by the user, to display words from the lookup buffer 23 which are relevant to a search. For example, to ascertain the translation of a single word in a sentence, the user might only want the words in the lookup buffer 23 which are relevant to the translation of the single word to be displayed.

The rearrangement module 30 reorders the search results or "target" words, for example, in a translation in order to obtain the most appropriate word order. An example of this is "John made good use of his knowledge" can be translated into French as "John bien utiliser son connaisance". However, a more appropriate, and intuitive, order would be "John utiliser bien son connaisance".

Figure 4:
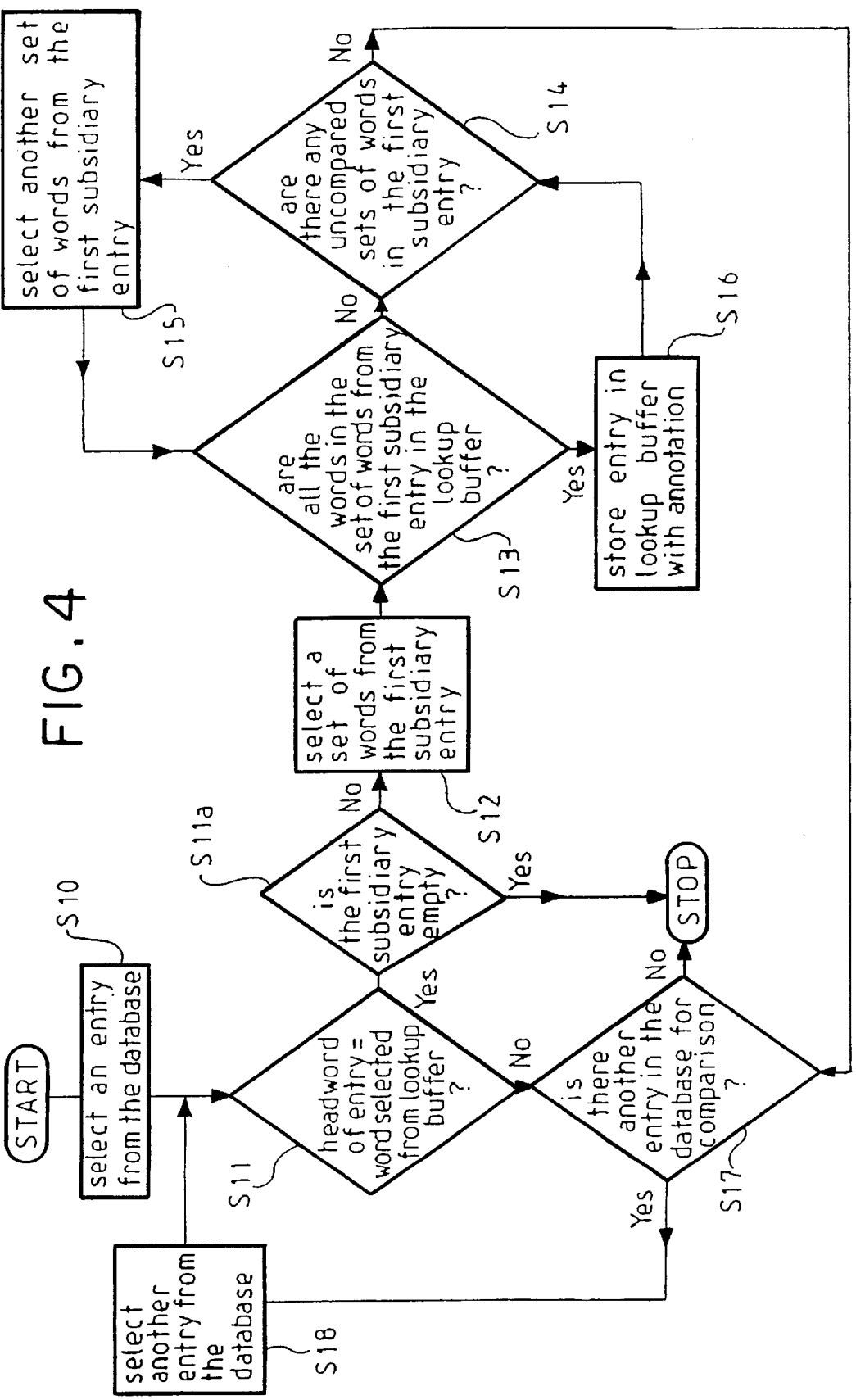
FIG. 4 is a flow diagram illustrating a step of the method shown in FIG. 3 in greater detail.

The searching of the database 28, storage of entries and annotation (step S5) will now be described with reference in FIG. 4.

An entry is selected from the database 28 (step S10) and the headword 1 of the entry is compared with the word selected from the lookup buffer 23 for searching (step S11) by the searching module 25.

If a match is found, the first subsidiary entry is examined to ascertain whether or not it contains any entries (Step S11a). If no entry exists, no further action is taken and the search of the database is terminated in respect of the word selected from the lookup buffer 23. If, however, an entry exists, a set of words is selected from the first subsidiary entry (step S12) and the lookup buffer 23 is searched (step S13) by the second selecting module 26 for the presence of these words in the lookup buffer 23. If all the words in the sets of words are found in the lookup buffer 23, the first subsidiary entry 2 is examined to ascertain whether there are any sets of words left which have not been searched in the lookup buffer 23 (step S14). If sets of words exist which have not yet been searched, each set of words is selected in turn (step S15) and searched (step S13) until no more unsearched sets of words remain in the first subsidiary entry 2. If when carrying out step S13 a match is found, the headword and the set of words in the first subsidiary entry are annotated and stored (step S16) for display by the output device 27 or manipulation by the user. The search against the sets of word in the first subsidiary entry 2 is then continued (steps S14, S15, S13) until no more unsearched sets of words remain.

If when comparing the headwords (step S11), a match is not found between the headword 1 of the entry selected at step S10 and the word from the lookup buffer 23 to be searched, the database 28 is examined to ascertain whether any entries exist whose headwords have not been compared with the word to be searched (step S17). If no more unsearched entries remain in the database 28, the search is terminated. However, if unsearched entries remain in the database 28, another entry is selected by the searching module 25 (step S18) and searched (step S11). It should be noted that, in the case where the database 28 contains unique headword entries, for example, an encyclopedia, the search is terminated once the word selected from the lookup buffer 23 is found (without searching any remaining unsearched entries in the database 28).

Figure 5:
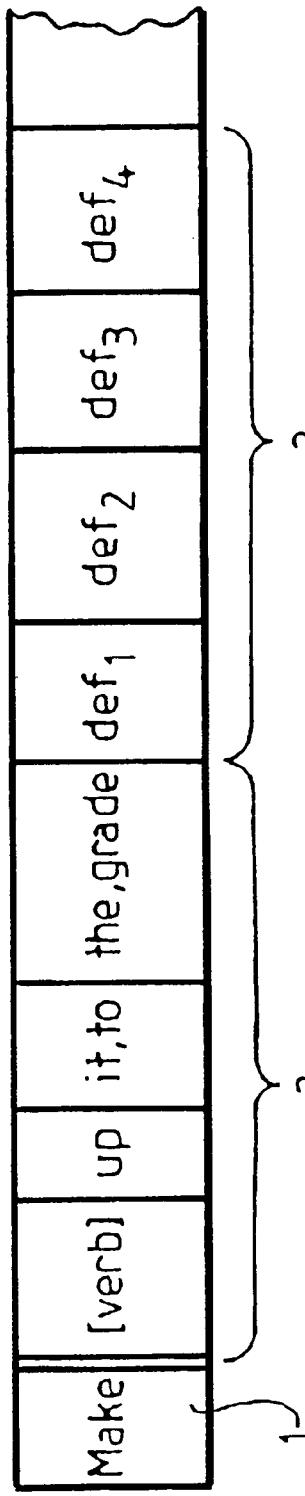
FIGS. 5 and 6 show the data structure of FIG. 1 containing example data.
Figure 6:
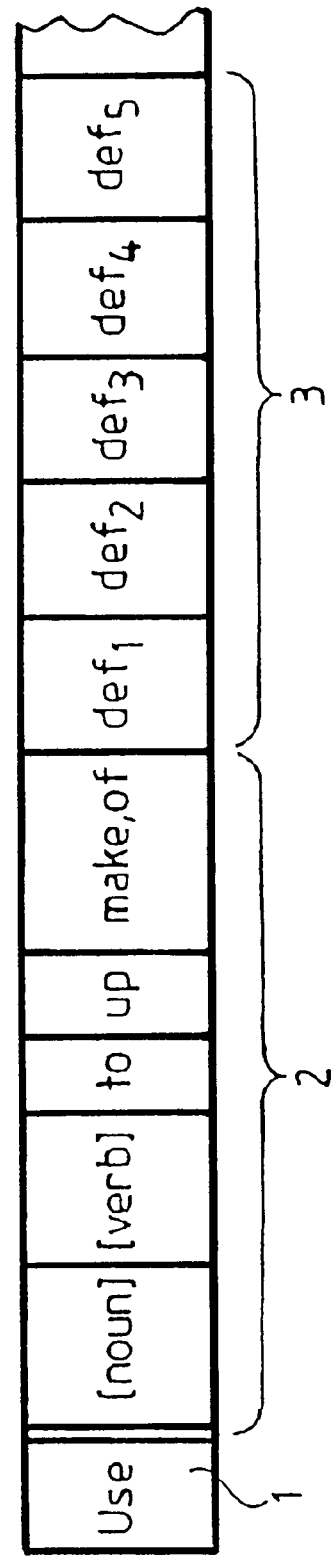

Referring to FIG. 7, if the example contents of the lookup buffer 23 "John make good use of his knowledge" is searched, when the word "make" is found, four possible definitions which include the headword 1 "make" are found ("make", "make up", "make it to", "make the grade") as can be seen from FIG. 5. However, only one of the definitions is suitable, since the other sets of words are not present in the lookup buffer 23. Similarly, the word "good" is looked up and then the word "use". At this stage, five possible sets of words are found for the word "use" (see FIG. 6) ("use" [noun],"use" [verb], "use to", "use up", "make use of"), of which, only three are suitable due to their presence in the lookup buffer 23, the most noteworthy of which is the entry "make use of". The lookup buffer 23 is updated with the appropriate database entries which are annotated with the words in the lookup buffer 23 to which they relate.

Once this is done, a user can query each word in turn, for example with the aid of a graphical user interface (GUI).

Each word of the section of text is displayed by the GUI. When a word in the section of text is queried by the user, the lookup buffer 23 is checked to find any annotations (headword pointers) associated to the word queried. The lookup buffer 23 is then searched for the presence of any annotated entries which point to the word queried. In this case of the word "make" in the present example, a headword pointer is found for the word "make" and a word pointer is found for the construction "make use of" ("use$_{2,5}$").

The words can be listed in order of preference, the criterion for preference being the number of words in the set of words in the first subsidiary entry 2; larger numbers would signify a higher preference. Thus, for an entry comprising only the headword, the preference value may be made equal to one. Where there are X number of words in a set associated with the headword, a preference value of (X+1) can be given to that set. Where the sets or combinations of words are displayed for user selection, they may be displayed in descending order of preference value.

Referring to FIG. 8, the above example can be extended to cover bilingual and multilingual dictionaries. The user can be given the option of selecting a target language.

As before, the section of text is reduced to dictionary headwords and then transferred to the lookup buffer 23. Each word is searched, and possible translations (database entries) for each word are stored in the lookup buffer 23 and, where appropriate, the entries are annotated as to which words in the lookup buffer 23 they relate.

As an example, the translation of the sentence "John made good use of his knowledge" into French is carried out as follows. Firstly, each word is reduced to its dictionary headword, i.e. "John make good use of his knowledge", and transferred to the lookup buffer 23. Each word in the lookup buffer 23 is searched in a dictionary (the database 28). The possible translations (entries) for each word are shown underneath the respective words in the table in FIG. 8. The subscripted numbers represent annotation as to which words in the lookup buffer 23 relate to a particular French word. For example, the verb "utiliser" also relates to the words "make" and "of" in addition to the word "use".

Once all the possible translations for each word in the section of text have been found, the user is able to query the results. It is possible to provide the user with an enumeration of all the consistent alternatives, but it is preferable to provide a menu of alternatives for each word, since this reduces the number of alternatives to list.

When the user selects a translation corresponding to the headword and a set containing at least one word from the first subsidiary entry, selection of translations of each word contained in the set may be inhibited since such words have already been covered by the selected translation. If the user decides to deselect that translation and to select another translation, the inhibition is removed and, if the other translation relates to a set containing at least one word, then translation of the or each word of the set is again inhibited.

Although such selection may be performed manually, it is possible to perform selections automatically where the various sets of words have been given preference values. For instance, all of the words may be used to access the dictionary so as to give rise to one or more combinations corresponding to each word. These combinations are arranged in descending order of preference and the highest preference combination is initially chosen. Words contained in the set associated with the relevant headword are then inhibited from taking further part in the process. From the remaining available sets of words, that having the highest preference value is selected, and so on. Such a technique may be used with a multilingual dictionary to provide a basic form of automatic translation, although further intervention may well be required in order to produce a final translation. For instance, in order to access the dictionary, the words entered in the lookup buffer may first have been reduced to basic forms. For instance, verbs may have been changed to the infinitive form and nouns may have been made singular. The initial translation may likewise contain basic forms so that, for instance, verbs have to be declined before a first attempt at a final translation is complete.

The user may intervene in this process, for instance to select sets or combinations of words having lower preference values. However, the system ensures that a word in the section of text cannot be used twice so as to avoid inconsistencies.

The multilingual dictionary may be a reversible dictionary, for example, for translating from English to French. An example of an entry is:

make *use of <=>* utiliser where "use" is the English headword associated to a number of first subsidiary entries as described above and a second subsidiary entry of "utiliser", and "utiliser" is the French headword having no first subsidiary entries, but a second subsidiary entry of "make use of". Thus, if found in the context of "make" and "of", "make use of" can be translated as "utiliser". Similarly, "utiliser" if found can be translated as "make use of".

If the database is a thesaurus, the database entries can be:

*make use of <=> utilise

*make (verb) <=> construct

*make (noun) <=> trade mark

*use (verb) <=> employ

The asterisk denotes a headword and the words on the right hand side of the <=22 symbol are second subsidiary entries. The words on the left hand side not marked with an asterisk and which are not in parenthesis are first subsidiary entries.

The headwords can also be annotated to describe the word's properties. Examples of annotations are shown above in parenthesis.

Additionally, the thesaurus can be a reversible thesaurus analogous to the reversible dictionary described above.

An alternative application of the database is as a usage checker. In such an application, the second subsidiary entry can contain a string of text. For example:

*make use of <=> "consider using just 'use'"

If the database is a monolingual dictionary, the second subsidiary entry can contain a pointer, for example:

*make use of <=> p245 where p245 is a pointer, or index, to an entry in a dictionary stored, for example, in memory or a CD-ROM. Such pointers can point to various types of entries, for example, text, sound, or films. Additionally, words, text and pointers can be simultaneously stored as second subsidiary entries. The database 28 can therefore be a multimedia encyclopedia.

What is claimed is:

1. A method of accessing a database comprising a plurality of entries, each entry comprising a main entry containing a headword and at least one of the entries comprising a first subsidiary entry containing a plurality of sets of words, each of which is capable of being associated with the headword, the method comprising the steps of:
 (i) entering a section of text comprising a plurality of words;
 (ii) locating the entry whose main entry contains the headword corresponding to a selected word of the section of text; and
 (iii) where the located entry has a first subsidiary entry containing a plurality of sets of words, selecting from the first subsidiary entry a set of words of which at least one word is present in at least part of the section of text.

2. A method as claimed in claim 1, wherein the section of text comprises a grammatically complete section.

3. A method as claimed in claim 1, wherein the at least part of the section of text comprises N words on each side of the selected word, where N is an integer greater than or equal to one.

4. A method as claimed in claim 1, wherein the steps (ii) and (iii) are repeated for each word of the section of text.

5. A method as claimed in claim 1, further comprising the step of allocating to each selected set a preference value determined as a function of the words in the set.

6. A method as claimed in claim 5, wherein the function corresponds to the cardinality of the set.

7. A method as claimed in claim 5, wherein the function corresponds to a property of one or more words in the set.

8. A method as claimed in claim 7, wherein the property is the probability of single or joint occurrence of the one or more words in the set.

9. A method as claimed in claim 5, wherein the function corresponds to the probability or frequency of use of the set.

10. A method as claimed in claim 1, wherein the database is a machine readable multilingual dictionary, the main entries and the first subsidiary entries contain source language words, and each entry further comprises a second subsidiary entry containing at least one target language translation of the headword.

11. A method as claimed in claim 10, wherein the multilingual dictionary is a reversible bilingual dictionary.

12. A method as claimed in claim 10, wherein each target language translation is associated with a respective set of words in the associated first subsidiary entry.

13. A method as claimed in claim 4, wherein the database is a machine readable multilingual dictionary, the main entries and the first subsidiary entries contain source language words, each entry further comprises a second subsidiary entry containing at least one target language translation of the headword, and each target language translation is associated with a respective set of words in the associated first subsidiary entry;
 further comprising the steps of selecting one of the target language translations and inhibiting selection of a translation of each word contained in the set of words associated with the selected translation.

14. A method as claimed in claim 13, further comprising the steps of:
 allocating to each selected set a preference value determined as a function of the words in the set; and,
 selecting the target language translations for the words of the section of text in descending order of the preference value.

15. A method as claimed in claim 13, further comprising the steps of deselecting the selected one of the target language translations, uninhibiting selection of a translation of each word contained in the set of words associated with the selected translation, selecting another of the target language translations, and inhibiting selection of a translation of each word contained in the set of words associated with the selected other translation.

16. A method as claimed in claim 1, wherein the database is a machine readable dictionary.

17. A method as claimed in claim 1, wherein the database is a machine readable thesaurus.

18. A method as claimed in claim 17, wherein the machine readable thesaurus is a reversible machine readable thesaurus.

19. A method as claimed in claim 16, wherein the located entry is given substantially the same linguistic inflection as the at least one word present in the at least part of the section of text.

20. A method as claimed in claim 17, wherein the located entry is given substantially the same linguistic inflection as the at least one word present in the at least part of the section of text.

21. A method as claimed in claim 1, wherein the database is a machine readable encyclopedia.

22. A method as claimed in claim 1, wherein the database is a multimedia encyclopedia.

23. A method as claimed in claim 1, wherein the database is stored on a CD-ROM.

24. An apparatus for accessing a database comprising a plurality of entries, each entry comprising a main entry containing a headword and at least one of the entries comprising a first subsidiary entry containing a plurality of sets of words, each of which is capable of being associated with the headword, the apparatus comprising:

(i) an input means for entering a section of text comprising a plurality of words;

(ii) means for locating the entry whose main entry contains the headword corresponding to a selected word of the section of text, and (iii) means for selecting from the first subsidiary entry a set of words of which at least one word is present in at least part of the section of text where the located entry has a first subsidiary entry containing a plurality of sets of words.

25. An apparatus as claimed in claim 24, wherein the section of text comprises a grammatically complete section.

26. An apparatus as claimed in claim 24, wherein the at least part of the section of text comprises N words on each side of the selected word, where N is an integer greater than or equal to one.

27. An apparatus as claimed in claim 24, wherein an allocating means is provided for allocating to each selected set a preference value as a function of the words in the set.

28. An apparatus as claimed in claim 27, wherein the function corresponds to the cardinality of the site.

29. An apparatus as claimed in claim 27, wherein the function corresponds to a property of one or more words in the set.

30. An apparatus as claimed in claim 29, wherein the property is the probability of single or joint occurrence of the one or more words in the set.

31. An apparatus as claimed in claim 27, wherein the function corresponds to the probability or frequency of use of the set.

32. An apparatus as claimed in claim 24, wherein the database is a machine readable multilingual dictionary, the main entries and the first subsidiary entries contain source language words, and each entry further comprises a second subsidiary entry containing at least one target language translation of the headword.

33. An apparatus as claimed in claim 32, wherein the multilingual dictionary is a reversible bilingual dictionary.

34. An apparatus as claimed in claim 32, wherein each target language translation is associated with a respective set of words in the associated first subsidiary entry.

35. An apparatus as claimed in claim 34, wherein the means for target language translation further comprising selecting one of the target language translations and inhibiting selection of a translation of each word contained in the set of words associated with the selected translation.

36. An apparatus as claimed in claim 27, wherein the database is a machine readable multilingual dictionary, the main entries and the first subsidiary entries contain source language words, each entry further comprises a second subsidiary entry containing at least one target language translation of the headword, and each target language translation is associated with a respective set of words in the associated first subsidiary entry; and the means for target language translation further comprises selecting one of the target language translations and inhibiting selection of a translation of each word contained in the set of words associated with the selected translation, and the means for target language translation further comprises selecting the target language translations for the words of the section of text in descending order of the preference values.

37. An apparatus as claimed in claim 35, wherein the means for target language translation further comprises deselecting the selected one of the target language translations, uninhibiting selection of a translation of each word contained in the set of words associated with the selected translation, selecting another of the target language translations, and inhibiting selection of a translation of each word contained in the set of words associated with the selected other translation.

38. An apparatus as claimed in claim 24, wherein the database is a machine readable dictionary.

39. An apparatus as claimed in claim 24, wherein the database is a machine readable thesaurus.

40. An apparatus as claimed in claim 39, wherein the machine readable thesaurus is a reversible machine readable thesaurus.

41. An apparatus as claimed in claim 38, wherein a generation means is provided for giving the located entry substantially the same linguistic inflection as the at least one word present in the at least part of the selection of text.

42. An apparatus as claimed in claim 39, wherein a generation means is provided for giving the located entry substantially the same linguistic inflection as the at least one word present in the at least part of the section of text.

43. An apparatus as claimed in claim 24, where the database is a machine readable encyclopedia.

44. An apparatus as claimed in claim 24, wherein the database is a multimedia dictionary.

45. An apparatus as claimed in claim 24, wherein the database is stored on a CD-ROM.

* * * * *